United States Patent [19]

Takiyama et al.

[11] Patent Number: 4,614,761

[45] Date of Patent: Sep. 30, 1986

[54] PROCESS FOR PRODUCING CURABLE RESIN

[75] Inventors: Eiichiro Takiyama, Kamakura; Katsuhisa Morita, Takasaki, both of Japan

[73] Assignee: Showa Highpolymer Co., Ltd., Tokyo, Japan

[21] Appl. No.: 712,772

[22] Filed: Mar. 18, 1985

[30] Foreign Application Priority Data

Mar. 19, 1984 [JP] Japan .................................. 59-51237

[51] Int. Cl.$^4$ .................................................. C08F 8/30
[52] U.S. Cl. ......................................... 525/59; 525/293
[58] Field of Search ................................... 525/59, 293

[56] References Cited

U.S. PATENT DOCUMENTS

| | | | |
|---|---|---|---|
| 3,305,606 | 2/1967 | Hardt et al. ........................... | 525/59 |
| 3,719,638 | 3/1973 | Huemmer et al. ................... | 525/293 |
| 3,855,379 | 12/1974 | Araki et al. ......................... | 525/293 |
| 3,925,320 | 12/1975 | Morgan ............................... | 525/293 |
| 3,928,299 | 12/1975 | Rosenkranz et al. ............... | 525/293 |
| 4,006,270 | 2/1977 | Morgan ............................... | 525/293 |
| 4,017,371 | 4/1977 | Morgan ............................... | 525/293 |
| 4,537,667 | 8/1985 | Bishop et al. ....................... | 525/293 |

*Primary Examiner*—Joseph L. Schofer
*Assistant Examiner*—Bernard Lipman
*Attorney, Agent, or Firm*—Sherman and Shalloway

[57] ABSTRACT

A process for producing a curable resin having unsaturated groups in the side chains through urethane linkages, which comprises reacting (A) a polymer having hydroxyl groups in the side chains with (B) an unsaturated monoisocyanate obtained by reacting 1 mole of a diisocyanate with more than 1 but less than 1.8 moles of an unsaturated monoalcohol.

7 Claims, No Drawings

PROCESS FOR PRODUCING CURABLE RESIN

This invention relates to a process for producing a curable resin having unsaturated groups in the side chains through urethane linkages stably without inducing gellation during the production.

Various kinds of radical-curable resins have been known. The first of such resins in chronological order is an unsaturated polyester resin, and diallyl phthalate resins were developed later. In recent years, so-called unsaturated acrylate-type resins (also called oligoacrylates) having acryloyl or methacrylol groups at the molecular ends have come into widespread acceptance because of their useful characteristics. In particular, there has been a striking increase in the use of vinyl ester resins (epoxy acrylates) in fields requiring corrosion resistance.

With an increasing range of use, however, these resins have been required to have properties which they did not previously possess. For example, they are required to have higher water and chemical resistances and high levels of film properties such as high hardness, high adhesion and excellent weatherability.

The conventional radical-curable resins have their own useful characteristics and are utilized for such, but cannot fully meet the above requirements.

For example, the unsaturated polyester resins and oligoacrylates have a molecular weight of about 3,000 at the highest before curing and contain hydrolyzable bonds such as an ester bond in the main chain of the molecules. Hence, these resins cannot have the required practical durability when used under severe conditons, for example, in circulating hot water at 100° C., and especially when used in the presence of a material other than resins, such as FRP including glass fibers.

The present inventors have made extensive investigations on resins which would exhibit properties not possessed by the conventional radical-curable resins, and consequently assumed that radical-curable resins having as high a molecular weight as possible and being free from a specific readily decomposable bond in the main chain are desirable.

In the production of an unsaturated polyester having an unsaturated bond in the main chain, abrupt gellation with an attendant increase in molecular weight tends to occur during the esterification, and it is extremely difficult to increase its molecular weight above a certain level, usually to about 3,000 or above. The presence of many ester linkages in the main chain means that the polyester has only a limited level of hydrolysis resistance. In fact, it is known that variations in the concentration of ester bonds per unit volume dominate the chemical and water resistance of resins.

In the case of an oligoacrylate having a crosslinking site such as an acryloyl or methacryloyl group at the molecular ends, typified by a vinyl ester resin, an attempt to increase its molecular weight above its usual limit of molecular weight naturally results in a decrease in crosslinking sites and reduces its curability. Thus, there is a marked tendency to deterioration in heat resistance and other properties. In addition, the synthesis of such oligoacrylates is difficult because of a rise in viscosity during the synthesis. In this case, too, the molecular weight of the resin cannot be increased too much, and the highest molecular weight obtainable is about 3,000.

To remedy the foregoing defect, attempts have previously been made to synthesize polymers having unsaturated bonds in the side chains. For example, the prior attempts include a method which comprises reacting a polymer containing a carboxyl group with an unsaturated epoxy compound such as glycidyl methacrylate in the presence of an organic solvent, and a method which comprises reacting a polymer containing an epoxy group with acrylic acid in the presence of an organic solvent. The polymers having unsaturated bonds in the side chains obtained by these methods are in the form of an organic solvent solution, and except where the polymers are to be used as a solution, the polymers must be separated from the solvent and dissolved in a polymerizable monomer (to be referred to simply as a monomer) in order to obtain polymers having unsaturated bonds in the side chains which are completely reactive and contain no volatile component. However, when a non-solvent is added to the solution of such a polymer having unsaturated bonds at the side chains in order to precipitate and dry the polymer, gellation occurs, and the desired polymer cannot be separated.

The present inventors extensively worked on a process for producing stably a polymer having unsaturated bonds in the side chains which is not limited in molecular weight, can be cured by conventional curing methods and has satisfactory properties. Consequently, the present inventors already proposed a process for producing a polymer having unsaturated groups at the side chains, which comprises reacting an unsaturated monoalcohol having an acryloyl or methacryloyl group with a diisocyanate compound at such proportions that the hydroxyl groups are substantially equimolar to the isocyanate groups to form an unsaturated isocyanate compound having an acryloyl or methacryloyl group and a free isocyanate group, then copolymerizing the resulting compound with another desired polymerizable monomer to synthesize a polymer having a free isocyanate group in the side chain, and finally adding an unsaturated monoalcohol and reacting the isocyanate groups with the hydroxyl groups. The radical-curable polymer having unsaturated bonds in the side chains obtained by this method was found to have characteristics not seen in conventional unsaturated polyester resins or vinyl ester resins. For example, it has excellent film-formability and moldability, and in spite of its radical-curability, forms a coated film having a non-tacky surface. Thus, it has proved to be useful as a curable resin.

Later investigations, however, led to the discovery that according to the above method, gellation occurs frequently in the last stage of polymer production and the polymerization reaction does not proceed stably.

The cause of gellation has been extensively studied, and it has been found that a product obtained by reacting one equivalent of the isocyanate groups of a diisocyanate with one equivalent of the hydroxyl group of a monoalcohol is not a pure unsaturated monoisocyanate even if a diisocyanate of the type in which the two isocyanate groups have different reactivities, such as 2,4-tolylene diisocyanate, is used. This will be explained in detail with reference to a specific example. For example, when 2-hydroxyethyl methacrylate is used as the unsaturated monoalcohol and 2,4-tolylene diisocyanate is used as the diisocyanate, a mixture composed of an unsaturated monoisocyanate of the formula

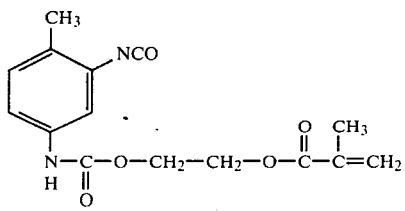

an unsaturated vinyl urethane of the formula

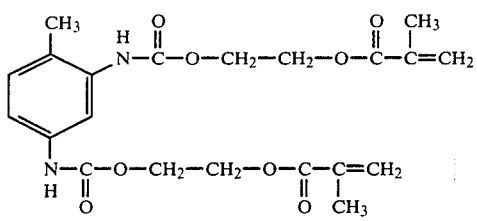

and 2,4-tolylene diisocyanate of the formula

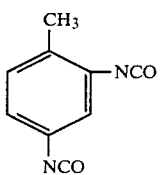

is formed. The unreacted diisocyanate (i.e., 2,4-tolylene diisocyanate) remaining in the mixture binds the hydroxyl groups of different polymers to each other to crosslink and gel the polymers.

From this viewpoint, the present inventors furthered their investigations and have now found that an unsaturated monoisocyanate substantially free from an unreacted diisocyanate is obtained by reacting 1 mole of a diisocyanate with more than 1 but less than 1.8 moles of an unsaturated monoalcohol, and that when the unsaturated monoisocyanate is reacted with a polymer having hydroxyl groups in the side chains, a curable resin having unsaturated groups in the side chains through urethane linkages can be obtained stably without gellation during the production.

Thus, according to this invention, there is provided a process for producing a curable resin having unsaturated groups in the side chains through urethane linkages, which comprises reacting (A) a polymer having hydroxyl groups in the side chains with (B) an unsaturated monoisocyanate obtained by reacting 1 mole of a diisocyanate with more than 1 but less than 1.8 moles of an unsaturated monoalcohol.

The polymer (A) having side-chain hydroxyl groups used in the process of this invention can be produced by copolymerizing (1) a vinyl monomer having a hydroxyl group and (2) another vinyl monomer.

The hydroxyl-containing vinyl monomer (1) may be an unsaturated alcohol such as 2-hydroxyethyl acrylate, 2-hydroxypropyl acrylate, 2-hydroxyethyl methacrylate, 2-hydroxypropyl methacrylate and methylol acrylamide. Allyl alcohol is not desirable as the material (1) for synthesizing the polymer having side-chain hydroxyl groups because it does not serve to increase the molecular weight of the polymer and the polymerization reaction stops at a stage of an "oligomer".

Typical examples of the other vinyl monomer (2) include vinyl aromatic compounds such styrene, vinyltoluene, chlorostyrene and tert.butylstyrene; methacrylates such as methyl methacrylate; acrylates such as ethyl acrylate, butyl acrylate and 2-ethylhexyl acrylate; unsaturated nitriles such as acrylonitrile; vinyl halides such as vinyl chloride; vinylidene halides such as vinylidene chloride; vinyl esters such as vinyl acetate and vinyl Versatate; and amides such as acrylamide.

A product obtained by converting the acetate group of a polymer obtained by copolymerizing vinyl acetate with such a monomer as vinyl chloride to a hydroxyl group can also be effectively used as the polymer (A) having hydroxyl groups in the side chains.

The copolymerization of the hydroxyl-containing vinyl monomer (1) with the other vinyl monomer (2) is carried out by conventional polymerization methods.

When it is carried out by a solution-polymerization method, the polymerization reaction product can be directly used in a subsequent step. When the polymerization is carried out by a bulk or pearl polymerization method, the resulting polymer may be used in a subsequent step after dissolving it in a monomer.

The hydroxyl group content of the polymer (A) having side-chain hydroxyl groups varies according to the usage of the product and cannot be generalized. Usually, it is preferably within the range of 1 to 50 mole %.

The unsaturated monoisocyanate used as component (B) in the present invention can be obtained by reacting 1 mole of a diisocyanate with more than 1 but less than 1.8 moles of an unsaturated monoalcohol.

Examples of the diisocyanate include 2,4-tolylene diisocyanate, a mixture of 2,4-tolylene diisocyanate and 2,6-tolylene diisocyanate, p,p'-diphenylmethane diisocyanate, xylylene diisocyanate, 1,5-naphthylene diisocyanate, p-phenylene diisocyanate, 1,6-hexamethylene diisocyanate, isophorone diisocyanate and hydrogenated xylylene diisocyanate.

Various unsaturated monoalcohols may be used to form the unsaturated monoisocyanate by reaction with the isocyanate groups of the diisocyanate. Examples are shown below.

(1) Monoalcohols Having a (Meth)acryloyl Group

2-Hydroxyethyl acrylate, 2-hydroxypropyl acrylate, 2-hydroxyethyl methacrylate and 2-hydroxypropyl methacrylate.

(2) Monoalcohols Having an Allyl Group

Allyl alcohol, allyl Cellosolve and trimethylolpropane diallyl ether.

(3) Products of Reaction of Monoepoxy Compounds with Unsaturated Carboxylic Acids (Excepting Those Belonging to (1))

Products of the reaction of phenyl glycidyl ether, butyl glycidyl ether or styrene oxide with acrylic or metharylic acid.

(4) Other Compounds

Methylol acrylamide and methylol methacrylamide.

The ratio of the diisocyanate and the unsaturated monoalcohol reacted is such that more than 1 but less than 1.8 moles, preferably 1.1 to 1.6 moles, of the unsaturated monoalcohol is used per mole of the diisocyanate.

When an unsaturated monoisocyanate obtained by reacting 1 mole of the diisocyanate with not more than 1 mole of the unsaturated monoalcohol is used, gellation occurs during the production of the resin, and the desired curable resin is difficult to obtain. On the other hand, when an unsaturated monoisocyanate obtained by reacting 1 mole of the diisocyanate with at least 1.8 moles of the unsaturated monoalcohol is used, the concentration of unsaturated linkages of the side chain of the resulting curable resin does not become high. Hence, the properties of the resin cannot be improved, and exceedingly long periods of time are required for curing. The resin obtained is therefore not practical.

The reaction of the diisocyanate with the unsaturated monoalcohol is carried out by dissolving the diisocyanate in a solvent or a monomer and adding the unsaturated monoalcohol dropwise to the solution.

Examples of the solvent are esters such as ethyl acetate, ketones such as methyl ethyl ketone, ethers such as tetrahydrofuran and aromatic hydrocarbons such as benzene. Examples of the monomer for dissolving the diisocyanate include styrene, vinyltoluene, methacrylic esters, acrylonitrile and acrylic esters.

The unsaturated monoisocyanate obtained by reacting the diisocyanate with the unsaturated monoalcohol in the aforesaid molar ratios does not substantially contain the unreacted diisocyanate, but usually contains a trace (for example, not more than 0.4 mole) of an unsaturated vinyl urethane. Preferably, the unsaturated monoisocyanate used in this invention is pure. However, an unsaturated monoisocyanate containing the unsaturated vinyl urethane may be used without any trouble if its unsaturated vinyl urethane content is nearly constant. In some cases, it serves to improve a property of the resin, for example increase the curability of the curable resin.

The next step in the process of this invention for obtaining the resin having an unsaturated group in the side chain through a urethane linkage is to react the hydroxyl groups of the polymer (A) having side-chain hydroxyl groups with the isocyanate groups of the unsaturated monoisocyanate (B).

The ratio of the polymer (A) and the unsaturated monoisocyanate (B) to be reacted is such that 0.1 to 1 mole, as the isocyanate group, of the unsaturated monoisocyanate (B) is used per mole of the hydroxyl groups of the polymer (A).

The reaction is carried out in the presence of a solvent or a monomer in an air stream or while blowing air. Preferably, a known urethanization catalyst such as tertiary amines and organic tin compounds or a known polymerization inhibitor for inhibiting polymerization during the reaction, such as polyhydric phenols, may preferably be used.

The solvent and monomer used in the reaction may be the same as those used in the production of the unsaturated monoisocyanate.

When the reaction is carried out in the presence of a solvent, the solvent may preferably be replaced by a monomer depending on the use of the resin. To replace the solvent by a monomer, it is preferred to add a monomer having a higher boiling point than the solvent to the polymerization reaction product and distill off the solvent by utilizing the difference in boiling point. When the reaction is carried out by using the monomer solution, the product can directly be used.

The resin having unsaturated groups in the side chains through urethane linkages produced by the process of this invention may be modified in various ways depending upon its uses (for example, a filler, glass fibers, a polymer etc. may be added). The resulting resin is useful not only as a material for producing fiber-reinforced plastics or cast articles, but also as paints and an adhesive.

The following Examples illustrate the present invention in more detail.

All parts and percentages in these examples are by weight.

EXAMPLE 1

(1) Synthesis of a Polymer (i) Having Side-Chain Hydroxyl Groups

A 1-liter four-necked separable flask equipped with a stirrer, a thermometer, a gas introducing tube and a reflux condenser was charged with 208 g of styrene, 58 g of 2-hydroxypropyl methacrylate (HPMA), 1.5 g of azobisisobutyronitrile, 0.1 g of laurylmercaptan and 132 g of ethyl acetate. Then, the temperature was raised and the monomers were polymerized for 16 hours in a nitrogen stream while refluxing ethyl acetate.

Hydroquinone (0.1 g) was added to stop the polymerization and obtain an ethyl acetate solution of the copolymer (polymer (i)) of styrene and HPMA having side-chain hydroxyl groups. The solution had a polymer concentration of 67%.

(2) Synthesis of an Unsaturated Monoisocyanate (a)

A 1-liter separable flask equipped with a stirrer, a thermometer, a dropping funnel and a reflux condenser was charged with 174 g (1 mole) of 2,4-tolylene diisocyanate, 130 g of ethyl acetate and 0.3 g of dibutyltin dilaurate. After the temperature was elevated to 60° C., 172 g (1.2 moles) of 2-hydroxypropyl methacrylate containing 100 ppm of benzoquinone was added dropwise. During the addition of 2-hydroxypropyl methacrylate, the heating was suspended. When the temperature decreased after the addition, the heating was resumed.

After the addition, the reaction mixture was maintained at the above temperature for 3 hours. A slightly brownish yellow 73% ethyl acetate solution of the unsaturated monoisocyanate (a) was obtained. An infrared analysis showed that the free hydroxyl group disappeared.

The resulting unsaturated monoisocyanate (a) did not contain the unreacted 2,4-toluene diisocyanate but contained a small amount (about 0.1 mole) of unsaturated vinyl urethane.

(3) Synthesis of a Resin (I) Having Unsaturated Groups in the Side Chains

To the entire resulting ethyl acetate solution of the polymer (i) containing side-chain hydroxyl groups were added 160 g of the ethyl acetate solution of the unsaturated monoisocyanate (a) and 0.3 g of butyltin dilaurate. The mixture was stirred at 60° C. for 5 hours in a steam of dry air. An infrared analysis showed that the free isocyanate group completely disappeared.

The reflux condenser was replaced by a fractionation condenser. Then, 400 g of styrene was added, and ethyl acetate was distilled off under a reduced pressure of about 600 mmHg.

There was obtained a pale yellowish brown slightly turbid styrene solution of the resin (I) having unsaturated groups in the side chains which had a viscosity of 5.1 poises. The reaction proceeded stably, and no gellation occurred.

The amount of the resin (I) (styrene solution) yielded was 649 g, and the weight ratio of the resin (I) to styrene was nearly 50:50.

When 2 parts of methyl ethyl ketone peroxide and 1 part of cobalt naphthenate (6% cobalt) were added to 100 parts of the styrene solution of the resin (I), the resin gelled in 23 minutes at room temperature. With gentle heat generation, the temperature reached 155° C. at the highest.

The resin had a Rockwell hardness of M-89, a heat distortion temperature of 110° C., and a flexural strength of 14.1 kg/mm$^2$.

The experiment of synthesizing the resin having unsaturated groups in the side chains was carried out five times by using the materials in the aforesaid amounts, and six times by using them in amounts ten times as large as the aforesaid amounts. In the total eleven experiments, no gellation occurred.

In contrast, the synthesis experiment was carried out three times under the same resin producing conditions using an adduct of 1 mole of 2,4-tolylene diisocyanate and 1 mole of 2-hydroxypropyl methacrylate as the unsaturated isocyanate. An agar-like gel formed in two out of the three experiments, and the desired resin could be synthesized only in one experiment.

EXAMPLE 2

(1) Synthesis of a Polymer (ii) Having Side-Chain Hydroxyl Groups

A 1-liter separable flask equipped with a stirrer, a thermometer, a gas introducing tube and a reflux condenser was charged with 120 g of methyl methacrylate, 40 g of ethyl acrylate, 53 g of 2-hydroxyethyl methacrylate, 147 g of toluene, 1 g of azobisisobutyronitrile and 0.2 g of laurylmercaptan. In a nitrogen stream, the temperature was raised, and the monomers were polymerized for 16 hours while refluxing toluene.

Then, 0.1 g of hydroquinone was added to give a 60% toluene solution of the polymer (ii).

(2) Synthesis of an Unsaturated Monoisocyanate (b)

A 1-liter separable flask equipped with a stirrer, a thermometer, a dropping funnel and a reflux condenser was charged with 222 g (1 mole) of isophorone diisocyanate, 150 g of toluene and 0.3 g of dibutyltin dilaurate. After the temperature was elevated to 60° C., 162 g (1.4 moles) of 2-hydroxyethyl acrylate containing 200 ppm of benzoquinone was added dropwise.

After the addition, the mixture was maintained at the same temperature for 3 hours. The disappearance of an absorption ascribable to the hydroxyl groups was observed, and a slightly yellowish brown 72% toluene solution of an unsaturated monoisocyanate (b) was obtained.

The unsaturated monoisocyanate (b) did not contain the unreacted isophorone diisocyanate and contained a small amount (about 0.2 mole) of unsaturated vinyl urethane.

(3) Synthesis of a Resin (II) Having Unsaturated Groups in the Side Chains

To the entire toluene solution of the polymer (ii) having side-chain hydroxyl groups described above were added 160 g of the toluene solution of the unsaturated monoisocyanate (b) and 0.3 g of dibutyltin dilaurate, and the mixture was reacted at 60° C. for 5 hours in a dry air stream. An infrared analysis showed that the free isocyanate group completely disappeared.

The reflux condenser was replaced by a fractionation condenser, and 260 g of trimethylolpropane triacrylate was added. Toluene was distilled off under a reduced pressure of about 550 mmHg.

When the distillation of toluene was no longer observed, 130 g of methyl methacrylate was added to give a monomer solution of the resins (II) having unsaturated groups in the side chains which was pale yellowish brown and had a viscosity of 14.1 poises. The reaction proceeded stably, and no gellation occurred during the reaction. The amount of the resin (II) (monomer solution) obtained was 698 g, and the weight ratio of the resin (II) to the monomer was nearly 50:50.

Two parts of a photosensitizer (Irgacure #651, a product of Ciba-Geigy AG was addded to 100 parts of the monomer solution of the resin (II) to form a photocurable resin. The photocurable resin was coated on a glass plate to a thickness of 100 microns by a bar coater, and passed beneath a 2 KW ultraviolet irradiating lamp, 10 cm apart, at a rate of 5 meters/min. to give a coated film having a hardness of 5H.

EXAMPLE 3

(1) Synthesis of a Polymer (iii) Having Side-Chain Hydroxyl Groups

Three hundred parts of a hydroxyl-containing polymer ("DENKA VINYL #1000GK" produced by Denki Kagaku Kogyo Co., Ltd.; vinyl chloride 91 mole %, vinyl acetate 2 mole %, polyvinyl alcohol 7 mole %) obtained by saponifying a copolymer of vinyl chloride and vinyl acetate was dissolved in 700 parts of ethyl acetate to form a polymer (iii) having hydroxyl groups in the side chains.

(2) Synthesis of a Resin (III) Having Unsaturated Groups in the Side Chains To the entire polymer (iii) having side-chain hydroxyl groups obtained as above were added 150 g of the ethyl acetate solution of the unsaturated monoisocyanate (a) produced in Example 1, 0.3 g of dibutyltin dilaurate and 0.07 g of benzoquinone. In a dry air stream, the mixture was reacted at 60° C. for 5 hours. Absorption of the isocyanate group was no longer observed at this stage, and a yellowish brown solution of the resin (III) having a viscosity of about 200 poises was obtained. The reaction proceeded stably, and no gellation occurred.

One hundred parts of the resin (III), 30 parts of an unsaturated alkyd (propylene glycol 11 moles, isophthalic acid 4 moles, maleic anhydride 6 moles, acid value 37.6), 10 parts of ethylene glycol dimethacrylate, 60 parts of acetone and 2 parts of tertiary butyl perbenzoate were mixed to form a uniform solution. The solution was impregnated into a sheet of tissue paper printed with a walnut pattern, and dried.

The tissue paper was placed on a slate board, 30 cm × 30 cm and 6 mm in thickness, and press-bonded at a temperature of 150° C. under a pressure of 30 kg/cm$^2$ for 3 minutes to obtain a decorative laminated plate having a hardness of 2H. The surface of the laminated plate was fire retardant.

EXAMPLE 4

(1) Synthesis of a Polymer (iv) Having Side-Chain Hydroxyl Groups

A 1-liter separable flask equipped with a stirrer, a thermometer, a reflux condenser and a gas introducing tube was charged with 208 g of styrene, 136 g of 2-hydroxyethyl methacrylate, 0.3 g of laurylmercaptan, 1.5 g of azobisisobutyronitrile and 156 g of ethyl acetate. The temperature was raised in a stream of nitrogen gas, and the monomers were polymerized for 16 hours while refluxing ethyl acetate. Then, 0.15 g of hydroquinone was added to give a 69% ethyl acetate solution of the polymer (iv).

(2) Synthesis of an Unsaturated Monoisocyanate (c)

A 1-liter separable flask equipped with a stirrer, a thermometer, a dropping funnel and a reflux condenser was charged with 188 g (1 mole) of xylylene diisocyanate, 147 g of ethyl acetate and 0.3 g of dibutyltin dilaurate. The temperature was raised to 50° C., and then 75 g (1.3 moles) of allyl alcohol containing 200 ppm of hydroquinone was added dropwise. After the addition, the temperature was raised to 60° C., and the mixture was maintained at this temperature for 3 hours to give a pale yellow 64% ethyl acetate solution of the unsaturated monoisocyanate (c). It was found that the absorption of the hydroxyl group disappeared.

The unsaturated monoisocyanate (c) did not substantially contain the unreacted xylylene diisocyanate and contained a small amount (about 0.15 mole) of unsaturated vinyl urethane.

(3) Synthesis of a Resin (IV) Having Unsaturated Groups in the Side Chains

To the entire ethyl acetate solution of the polymer (iv) obtained as above were added 300 g of the ethyl acetate solution of the unsaturated monoisocyanate (c) and 0.2 g of dibutyltin dilaurate. The mixture was reacted at 60° C. for 5 hours in dry air. An infrared analysis showed that the absorption of the isocyanate group completely disappeared, and the resin (IV) having an allyl group in the side chain through a urethane linkage was obtained as a pale yellowish brown solution. The reaction proceeded stably, and no gellation occurred.

The same tissue paper as used in Example 3 was impregnated with a solution composed of 100 parts of the resin (IV), 1 part of dicumyl peroxide and 50 parts of acetone, followed by drying.

The tissue paper was then placed on a slate board, 30 cm×30 cm and 6 mm in thickness, and press-bonded at a tempeature of 160° C. under a pressure of 30 kg/cm² for 5 minutes to give a decorative plate having a surface hardness of 4H.

EXAMPLE 5

(1) Synthesis of an Unsaturated Monoisocyanate (d)

A 1-liter separable flask equipped with a stirrer, a reflux condenser, a thermometer and a gas introducing tube was charged with 150 g of phenyl glycidyl ether, 72 g of acrylic acid, 6 g of triethylamine and 0.1 g of hydroquinone. While triethylamine was refluxed at 110° C., the reaction was carried out for 3 hours. The acid value of the product was 4.6.

The temperature was then lowered to 60° C., and the reflux condenser was replaced by a fractionation condenser. Triethylamine was distilled off first under normal atmospheric pressure and then under a reduced pressure of about 500 mmHg. There was obtained 1 mole of pale yellowish brown beta-hydroxyphenoxypropyl acrylate of the following formula:

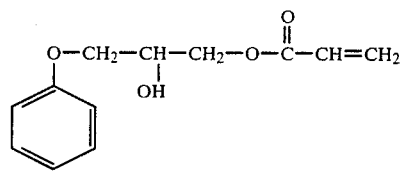

Ethyl acetate (180 g) was added to this compound, and further 0.5 g of dibutyltin dilaurate and 175 g (0.7 mole) of p,p'-diphenylmethane diisocyanate were added. The mixture was reacted at 60° C. for 5 hours in a stream of dry air. An infrared analysis showed no absorption of the hydroxyl group, and a yellowish brown 69% ethyl acetate solution of the unsaturated monoisocyanate (d) was obtained.

The resulting unsaturated monoisocyanate (d) did not contain the unreacted p,p'-diphenylmethane diisocyanate and contained a small amount (0.5 mole) of unsaturated vinyl urethane.

(3) Synthesis of a Resin (V) Having Unsaturated Groups in the Side Chains

To the entire polymer (ii) having side-chain hydroxyl groups prepared as in Example 2 was added 350 g of the ethyl acetate solution of the unsaturated monoisocyanate (d) prepared as above, and the mixture was reacted at 60° C. for 5 hours in dry air. An infrared analysis showed that the free isocyanate group completely disappeared.

The reflux condenser was replaced by a fractionation condenser. About 150 g of ethyl acetate was distilled off under atmospheric pressure. Then, 300 g of phenoxyethyl acrylate was added, and the remaining toluene was distilled off under a reduced pressure of about 550 mmHg. There was obtained resin (V) having unsaturated groups in the side chains as a yellowish brown solution having a viscosity of about 110 poises. The reaction proceeded stably, and no gellation occurred.

To 100 parts of the resin (V) were added 20 parts of phenoxyethyl acrylate, 3 parts of acrylic acid and 3 parts of a photosensitizer (Irgacure #651 produced by Ciba-Geigy AG) to produce a photocurable resin. The photocurable resin was coated on a steel plate subjected to Bondelite treatment to a thickness of 0.2 mm by a bar coater, and passed twice beneath the same ultraviolet light irradiation device as used in Example 2 at a rate of 3 meters/min. A coated film having a hardness of 2H and a crosscut tape test value of 100/100 was obtained on the steel plate.

COMPARATIVE EXAMPLE

(1) Synthesis of a Polymer (i) Having Side-Chain Hydroxyl Groups

The same 67% ethyl acetate solution of copolymer (i) as in Example 1 was prepared in the same way as in Example 1.

(2) Synthesis of an Unsaturated Monoisocyanate (e)

A 1-liter separable flask equipped with a stirrer, a thermometer, a dropping funnel and a reflux condenser was charged with 174 g (1 mole) of 2,4-tolylene diisocyanate, 130 g of ethyl acetate and 0.3 g of dibutyltin dilaurate. After the temperature was elevated to 60° C., 274 g (1.9 moles) of 2-hydroxypropyl methacrylate containing 100 ppm of benzoquinone was added dropwise. During the addition of 2-hydroxypropyl methacrylate, the heating was suspended. When the temperature decreased after the addition, the heating was resumed.

After the addition, the reaction mixture was maintained at the above temperature for 3 hours. A slightly brownish yellow 87% ethyl acetate solution of the unsaturated monoisocyanate (e) was obtained. An infrared analysis showed that the free hydroxyl group disappeared.

The resulting unsaturated monoisocyanate (e) did not contain the unreacted 2,4-toluene diisocyanate but contained a large amount (about 0.95 mole) of unsaturated vinyl urethane.

(3) Synthesis of a Resin (VI) Having Unsaturated Groups in the Side Chains

To the entire resulting ethyl acetate solution of the polymer (i) containing side-chain hydroxyl groups were added 160 g of the ethyl acetate solution of the unsaturated monoisocyanate (e) and 0.3 g of butyltin dilaurate. The mixture was stirred at 60° C. for 5 hours in a stream of dry air. An infrared analysis showed that the free isocyanate group completely disappeared.

The reflux condenser was replaced by a fractionation condenser. Then, 500 g of styrene was added, and ethyl acetate was distilled off under a reduced pressure of about 600 mmHg.

There was obtained a pale yellowish brown slightly turbid styrene solution of the resin (VI) having unsaturated groups in the side chains which had a viscosity of 3.9 poises. The reaction proceeded stably, and no gellation occurred.

The amount of the resin (VI) (styrene solution) yielded was 749 g, and the weight ratio of the resin (VI) to styrene was nearly 50:50.

When 2 parts of methyl ethyl ketone peroxide and 1 part of cobalt naphthenate (6% cobalt) were added to 100 parts of the styrene solution of the resin (VI), the resin gelled in 89 minutes at room temperature. With gentle heat generation, the temperature reached 124° C. at the highest.

The cured resin was whitely turbid because of the separation of the polymer, and its properties were difficult to measure.

What is claimed is:

1. A process for producing a curable resin having unsaturated groups in the side chains through urethane linkages, which comprises reacting (A) a polymer having hydroxyl groups in the side chains selected from the group consisting of a copolymer of a hydroxyl (meth)acrylate with another vinyl monomer and a saponification product of a copolymer of vinyl acetate and another vinyl monomer with (B) an unsaturated monoisocyanate obtained by reacting 1 mole of a diisocyanate with 1.1 to 1.6 moles of an unsaturated monoalcohol.

2. The process of claim 1, wherein the hydroxyl (meth)acrylate is 2-hydroxyethyl (meth)acrylate or 2-hydroxypropyl (meth)acrylate.

3. The process of claim 1 wherein the another vinyl monomer is styrene or methyl methacrylate.

4. The process of claim 1 wherein the diisocyanate is 2,4-tolylene diisocyanate, isophorone diisocyanate, xylylene diisocyanate or p,p'-diphenylmethane diisocyanate.

5. The process of claim 1 wherein the unsaturated monoalcohol is 2-hydroxypropyl methacrylate, 2-hydroxyethyl acrylate, allyl alcohol or β-hydroxyphenoxypropyl acrylate.

6. The process of claim 1 wherein the unsaturated monoisocyanate (B) is one which is obtained by reacting 1 mole of a diisocyanate with 1.2 to 1.4 moles of a hydroxyl (meth)acrylate.

7. The process of claim 6 wherein the diisocyanate is 2,4-tolylene isocyanate and hydroxyl (meth)acrylate is 2-hydroxypropyl methacrylate.

* * * * *